United States Patent
Yang et al.

(10) Patent No.: US 12,191,528 B2
(45) Date of Patent: Jan. 7, 2025

(54) BATTERY AND ELECTRONIC DEVICE INCLUDING THE SAME

(71) Applicant: DONGGUAN NVT TECHNOLOGY LIMITED, Dongguan (CN)

(72) Inventors: Shujun Yang, Dongguan (CN); Yumei Liang, Dongguan (CN); Ye Liu, Dongguan (CN); Shungang Ning, Dongguan (CN); Guanghui Chen, Dongguan (CN); Tiejun Huang, Dongguan (CN)

(73) Assignee: DONGGUAN NVT TECHNOLOGY LIMITED, Guangdong (CN)

( * ) Notice: Subject to any disclaimer, the term of this patent is extended or adjusted under 35 U.S.C. 154(b) by 874 days.

(21) Appl. No.: 17/339,852

(22) Filed: Jun. 4, 2021

(65) Prior Publication Data
US 2021/0296740 A1 Sep. 23, 2021

Related U.S. Application Data

(63) Continuation-in-part of application No. PCT/CN2020/082123, filed on Mar. 30, 2020, and a
(Continued)

(30) Foreign Application Priority Data

Jun. 5, 2020 (CN) .......................... 202010507073.5

(51) Int. Cl.
*H01M 50/528* (2021.01)
*H01M 10/42* (2006.01)

(52) U.S. Cl.
CPC ....... *H01M 50/528* (2021.01); *H01M 10/425* (2013.01); *H01M 2010/4271* (2013.01)

(58) Field of Classification Search
CPC ............. H01M 50/528; H01M 10/425; H01M 2010/4271; H01M 10/4257;
(Continued)

(56) References Cited

U.S. PATENT DOCUMENTS 8,715,842 B2  5/2014 Lee et al.
9,520,586 B2* 12/2016 Hofer .................. H01M 50/209
(Continued)

FOREIGN PATENT DOCUMENTS

CN  103814499 A   5/2014
CN  204741041 U  11/2015
(Continued)

OTHER PUBLICATIONS

International Search Report and Written Opinion, PCT/CN2020/078848, Nov. 26, 2020, 9 pgs.—No Translation Available-.
(Continued)

*Primary Examiner* — Abdullah A Riyami
*Assistant Examiner* — Nader J Alhawamdeh
(74) *Attorney, Agent, or Firm* — Morgan, Lewis & Bockius LLP

(57) ABSTRACT

A battery is disclosed, including a battery cell and a protection circuit board. The battery cell includes a cell body; a first tab, and a second tab. The first tab electrically connects the cell body and the protection circuit board. The second tab electrically connects the cell body and the protection circuit board. A polarity of the second tab is opposite to that of the first tab. The third tab electrically connects the cell body and the protection circuit board. A polarity of the third tab is same as that of the first tab, thereby being conducive to reducing temperature rise of the battery cell and the protection circuit board in use. This application further provides an electronic device that uses the battery.

16 Claims, 26 Drawing Sheets

Related U.S. Application Data continuation-in-part of application No. PCT/CN2020/078848, filed on Mar. 11, 2020.

(58) Field of Classification Search
CPC ............ H01M 50/202; H01M 50/284; H01M 50/296; H01M 2200/00; Y02E 60/10
See application file for complete search history.

(56) References Cited

U.S. PATENT DOCUMENTS

| | | | |
|---|---|---|---|
| 2008/0226973 | A1 | 9/2008 | Jang et al. |
| 2009/0068501 | A1 | 3/2009 | Hong et al. |
| 2010/0124693 | A1* | 5/2010 | Kosugi ............... H01M 50/516 429/92 |
| 2012/0052367 | A1 | 3/2012 | Hwang |
| 2012/0231320 | A1* | 9/2012 | Heck ................... H01M 50/522 429/159 |
| 2015/0343919 | A1* | 12/2015 | Sakata ................. H01M 10/625 320/109 |
| 2021/0296740 | A1* | 9/2021 | Yang .................. H01M 10/4257 |

FOREIGN PATENT DOCUMENTS

| | | |
|---|---|---|
| CN | 204760490 U | 11/2015 |
| CN | 105958561 A | 9/2016 |
| CN | 106129494 A | 11/2016 |
| CN | 107017377 A | 8/2017 |
| CN | 206742424 U | 12/2017 |
| CN | 107666006 A | 2/2018 |
| CN | 207250574 U | 4/2018 |
| CN | 108091809 A | 5/2018 |
| CN | 207530023 U | 6/2018 |
| CN | 108630995 A | 10/2018 |
| CN | 108987655 A | 12/2018 |
| CN | 109830766 A | 5/2019 |
| CN | 209658345 U | 11/2019 |
| CN | 110832692 A | 2/2020 |
| CN | 110867552 A | 3/2020 |
| CN | 210668605 U | 6/2020 |
| CN | 111403675 A | 7/2020 |
| JP | 4204237 B2 | 1/2009 |
| JP | 6284251 B1 | 2/2018 |
| JP | 2018098154 A | 6/2018 |
| WO | WO2017/219359 A1 | 12/2017 |
| WO | WO2019/098588 A1 | 5/2019 |

OTHER PUBLICATIONS

International Search Report and Written Opinion, PCT/CN2020/082123, Jan. 7, 2021, 8 pgs.—No Translation Available-.
Dongguan NVT Technology Limited, European Search Report, EP20919358.0, Jun. 29, 2022, 7 pgs.
Dongguan NVT Technology Limited, European Search Report, EP20919363.0, Mar. 29, 2022, 8 pgs.
Dongguan NVT Technology Limited, European Search Report, EP20919363.0, Mar. 12, 2024, 4 pgs.
Dongguan NVT Technology Limited, Examination Report Under Sections 12 & 13 of the Patents Act, 1970 and the Patents Rules, 2003, Application No. IN202117035587, Oct. 18, 2022, 6 pgs.
Dongguan NVT Technology Limited, Examination Report Under Sections 12 & 13 of the Patents Act, 1970 and the Patents Rules, 2003, Application No. IN202117036787, Nov. 11, 2022, 6 pgs.
Dongguan NVT Technology Limited, Hearing Notice in Reference of Application No. IN202117036787, Apr. 1, 2024, 2 pgs.
Office Action, CN202090000296.6, Dec. 2, 2021, 2 pgs.
Office Action, CN202090000296.6, Feb. 17, 2022, 2 pgs.
Office Action, CN202080006657.2, Apr. 24, 2022, 8 pgs.
Office Action, CN202080006657.2, Aug. 12, 2022, 6 pgs.
Office Action, CN202080006657.2, Jan. 12, 2023, 6 pgs.
Office Action, CN202010507073.5, Jan. 5, 2023, 7 pgs.
Office Action, CN202010507073.5, Aug. 19, 2023, 7 pgs.
Office Action, CN202010507073.5, Feb. 29, 2024, 5 pgs.
Decision of Refusal, CN202010507073.5, May 17, 2024, 4 pgs.

* cited by examiner

BATTERY AND ELECTRONIC DEVICE INCLUDING THE SAME

CROSS-REFERENCE TO RELATED APPLICATIONS

This application is a continuation-in-part application of PCT International Application No. PCT/CN2020/082123, filed on Mar. 30, 2020. This application is also a continuation-in-part application of PCT International Application No. PCT/CN2020/078848, filed on Mar. 11, 2020, and this application claims priority to Chinese Patent Application No. 202010507073.5 filed on Jun. 5, 2020 in the China Intellectual Property Office, The content of each of the above applications is hereby incorporated by reference in its entirety.

TECHNICAL FIELD

This application relates to the field of batteries, and in particular, to a battery and an electronic device that uses the same.

BACKGROUND

Currently, by virtue of advantages such as a high energy density, a high power density, a large number of cycles, and a long storage time, a lithium-ion battery is widely used in portable electronic devices such as a mobile phone, a digital camera, and a laptop computer, embraces a prospect of wide use in large and medium-sized electric equipment such as electric vehicles, electric bicycles and other electric means of transport and energy storage facilities, and has become a linchpin of solving global problems such as energy crisis and environmental pollution.

In pursuit of product performance, users are constantly raising new requirements on fast charge of the battery and support of higher-power output, thereby posing a huge challenge to high efficiency, stability, and reliability of a battery management circuit. When the battery management circuit needs to bear higher power, emission of heat of a battery cell and a component causes overheating and performance deterioration of the battery and lower reliability of or even damage to the circuit, or even lead to safety problems.

SUMMARY

In view of the foregoing situation, it is necessary to provide a high-reliability battery. It is also necessary to provide an electronic device 1 that uses the battery, so as to meet requirements of passing a high current and reduce temperature rise caused by heat emission.

A battery is disclosed, including a battery cell and a protection circuit board. The battery cell includes a cell body; a first connecting piece, configured to electrically connect the cell body and the protection circuit board; a second connecting piece, configured to electrically connect the cell body and the protection circuit board, where a polarity of the second connecting piece is opposite to that of the first connecting piece.

The battery cell further includes a third connecting piece, configured to electrically connect the cell body and the protection circuit board, where a polarity of the third connecting piece is same as that of the first connecting piece.

An electronic device is disclosed. The electronic device includes a battery. The battery includes a battery cell and a protection circuit board. The battery cell includes a cell body; a first connecting piece, configured to electrically connect the cell body and the protection circuit board; a second connecting piece, configured to electrically connect the cell body and the protection circuit board, where a polarity of the second connecting piece is opposite to that of the first connecting piece; and a third connecting piece, configured to electrically connect the cell body and the protection circuit board, where a polarity of the third connecting piece is same as that of the first connecting piece.

In the battery and the electronic device that uses the battery according to this application, the battery cell performs outputting through the first connecting piece and the third connecting piece that have identical polarity, thereby reducing concentration of heat of the battery cell during the outputting and being conducive to dissipation of heat. In addition, the first connecting piece and the third connecting piece that have identical polarity are electrically connected to the protection circuit board, thereby facilitating the wiring in the protection circuit board and streamlining the wiring in the protection circuit board. This effectively reduces the rise of overall impedance of the protection circuit board caused by the bending of local wiring, thereby reducing the temperature rise of the protection circuit board during use of the battery and helping to improve stability of the battery.

REFERENCE NUMERALS

Figure 1:
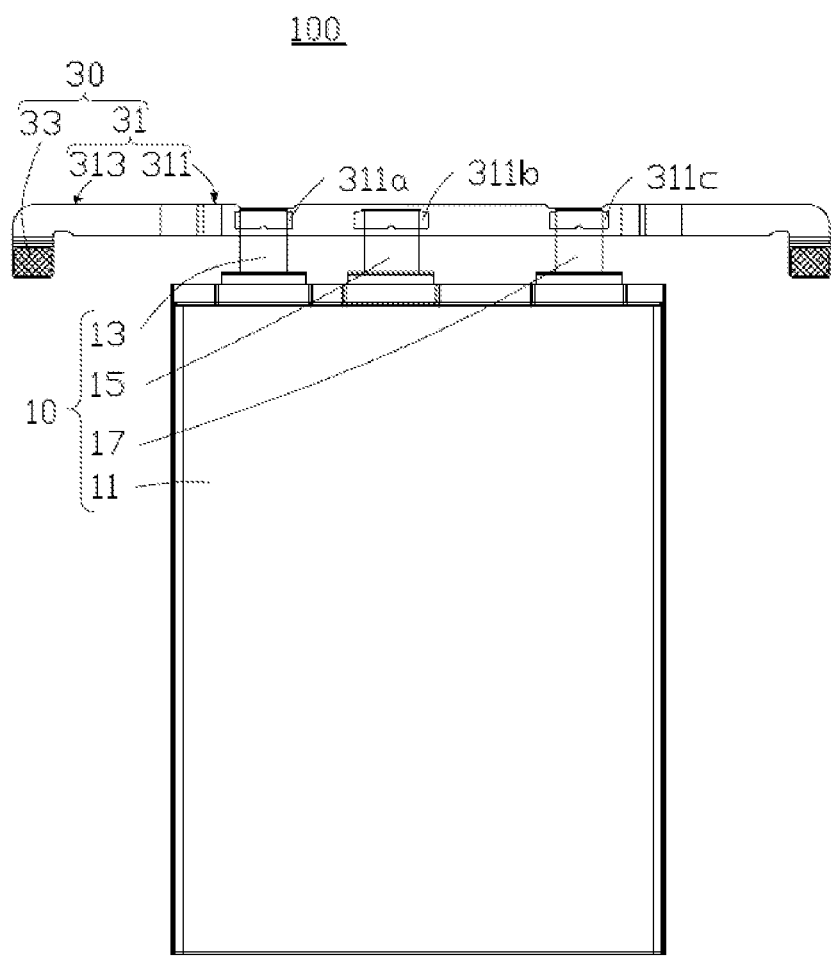
FIG. 1 is a schematic structural diagram of a battery according to an embodiment of this application.

| Reference numerals: | |
| --- | --- |
| Battery | 100 |
| Battery cell | 10 |
| Protection circuit board | 30 |
| Cell body | 11 |
| First connecting piece | 13 |
| Second connecting piece | 15 |
| Third connecting piece | 17 |
| Fourth connecting piece | 19 |
| First protection board | 31 |
| Second protection board | 32 |
| First connector | 33 |
| Second connector | 34 |
| Rigid board region | 311 |
| Flexible board region | 313 |
| First input end | 311a |
| Second input end | 311b |
| Third input end | 311c |
| Electronic device | 1 |
| Main body | 5 |
| First connector adapter | 50 |
| Second connector adapter | 60 |

This application is further described below with reference to the following specific embodiments and the foregoing drawings.

DETAILED DESCRIPTION

The following describes the technical solutions in the embodiments of this application with reference to the drawings hereof. Apparently, the described embodiments are merely a part of but not all of the embodiments of this application. All other embodiments derived by a person of ordinary skill in the art based on the embodiments of this application without making any creative efforts shall fall within the protection scope of this application.

Unless otherwise defined, all technical and scientific terms used herein have the same meanings as usually understood by a person skilled in the technical field of this application. The terms used in the specification of this application herein are merely intended for describing specific embodiments but are not intended to limit this application.

The following describes some embodiments of this application in detail with reference to drawings. To the extent that no conflict occurs, the following embodiments and the features in the embodiments may be combined with each other.

Referring to FIG. 1, according to an embodiment of this application, a battery 100 includes a battery cell 10 and a protection circuit board 30. The battery cell 10 is electrically connected to the protection circuit board 30.

The battery cell 10 includes a cell body 11, a first connecting piece 13, a second connecting piece 15, and a third connecting piece 17. One end of the first connecting piece 13 is electrically connected to the cell body 11, and the other end is electrically connected to the protection circuit board 30. A polarity of the second connecting piece 15 is opposite to that of the first connecting piece 13. One end of the second connecting piece 15 is electrically connected to the cell body 11, and the other end is electrically connected to the protection circuit board 30. A polarity of the third connecting piece 17 is same as that of the first connecting piece 13. One end of the third connecting piece 17 is electrically connected to the cell body 11, and the other end is electrically connected to the protection circuit board 30. The battery cell 10 performs outputting through the first connecting piece 13 and the third connecting piece 17 that have identical polarity, thereby reducing concentration of heat of the battery cell 10 during the outputting and being conducive to dissipation of heat. In addition, the first connecting piece 13 and the third connecting piece 17 that have identical polarity are electrically connected to the protection circuit board 30. In this way, internal lines in the protection circuit board 30 may be electrically connected to the first connecting piece 13 or the third connecting piece 17 as required, so as to reduce bending or extension of wires required for avoidance of interference between devices, facilitate the wiring in the protection circuit board 30, and streamline the wiring in the protection circuit board 30. This helps to reduce the overall impedance of the protection circuit board 30, and reduce the temperature rise of the protection circuit board 30 during use of the battery 100.

In this embodiment, both the first connecting piece 13 and the third connecting piece 17 are positive tabs, and the second connecting piece 15 is a negative tab. In other embodiments, both the first connecting piece 13 and the third connecting piece 17 may be negative tabs. In this case, the second connecting piece 15 is a positive tab.

In some embodiments, the first connecting piece 13 and the third connecting piece 17 are located on a same side of the cell body 11.

The first connecting piece 13 and the third connecting piece 17 are electrically connected to the cell body 11 independently.

In this embodiment, the first connecting piece 13 and the third connecting piece 17 are spaced apart. Preferably, the second connecting piece 15 is disposed between the first connecting piece 13 and the third connecting piece 17, and are spaced apart from the first connecting piece 13 and the third connecting piece 17 respectively, thereby further facilitating the subsequent wiring of the protection circuit board 30.

Figure 2:
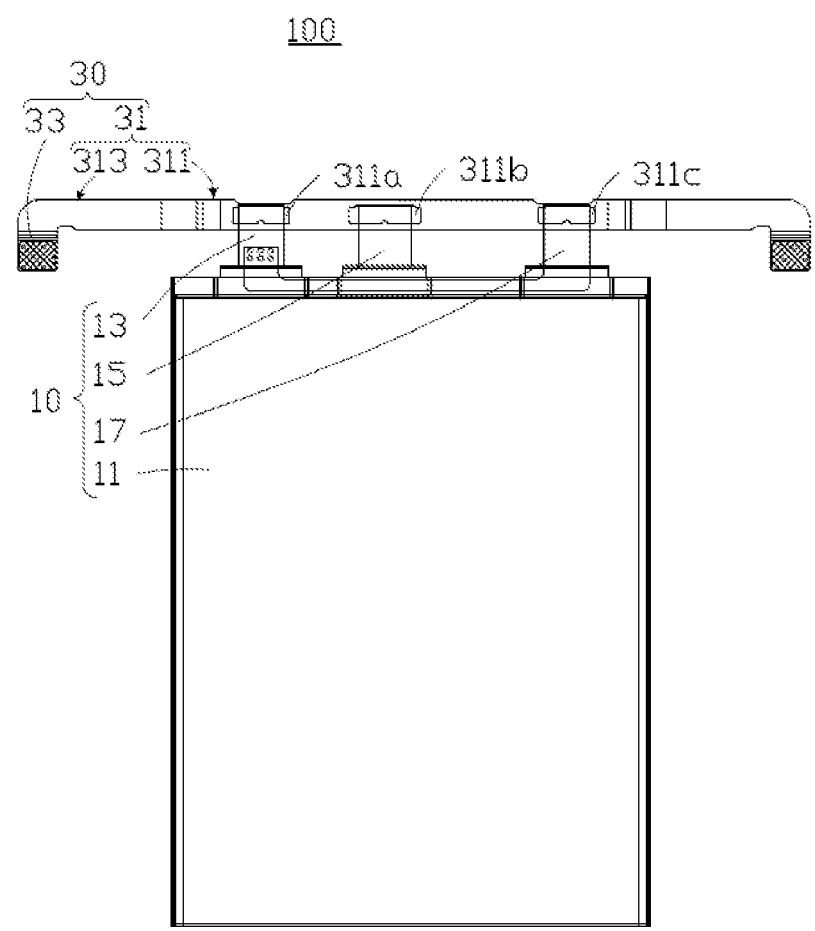
FIG. 2 is a schematic structural diagram of a battery according to an embodiment of this application.

In some embodiments, referring to FIG. 2, the third connecting piece 17 is electrically connected to the cell body 11 by the first connecting piece 13. Specifically, one end of the first connecting piece 13 is connected to the cell body 11, and the other end is connected to the protection circuit board 30. One end of the third connecting piece 17 is electrically connected to the first connecting piece 13, and the other end is electrically connected to the protection circuit board 30. In some embodiments, the third connecting piece 17 may be connected to the first connecting piece 13 by a nickel strap or a flexible circuit board.

The protection circuit board 30 includes a circuit board body and at least one connector. The connector is disposed on the circuit board body.

In some embodiments, referring to FIG. 1 and FIG. 2, the circuit board body is a rigid-flex board, and includes a rigid board region 311 and a flexible board region 313 connected to the rigid board region 311. The rigid board region 311 and the flexible board region 313 are integrally designed. The connector is disposed in the flexible board region 313.

The hard board region 311 includes a first input end 311a, a second input end 311b, and a third input end 311c that are spaced apart. The first input end 311a is electrically connected to the first connecting piece 13. The second input end 311b is electrically connected to the second connecting piece 15. The third input end 311c is electrically connected to the third connecting piece 17.

In this embodiment, the circuit board body includes two flexible board regions 313 and two connectors. The hard board region 311 is located between the two flexible board regions 313. Preferably, one flexible board region 313 is disposed adjacent to the first connecting piece 13, and another flexible board region 313 is disposed adjacent to the third connecting piece 17. One connector is disposed on each flexible board region 313. Each connector is electrically connected to the first input end 311a or the third input end 311c, and each connector is electrically connected to the second input end 311b.

Figure 3:
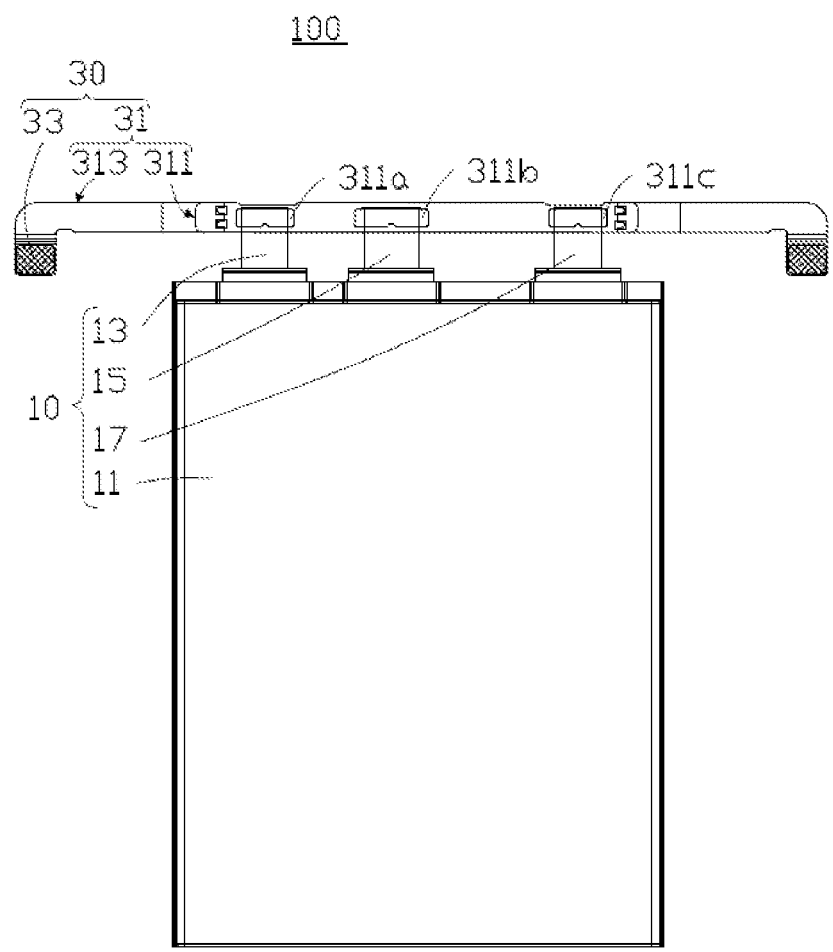
FIG. 3 is a schematic structural diagram of a battery according to an embodiment of this application.

In some embodiments, referring to FIG. 3, the rigid board region 311 is connected to the flexible board region 313 by welding, thereby being more cost-effective than an integrated rigid-flex board.

Figure 4:
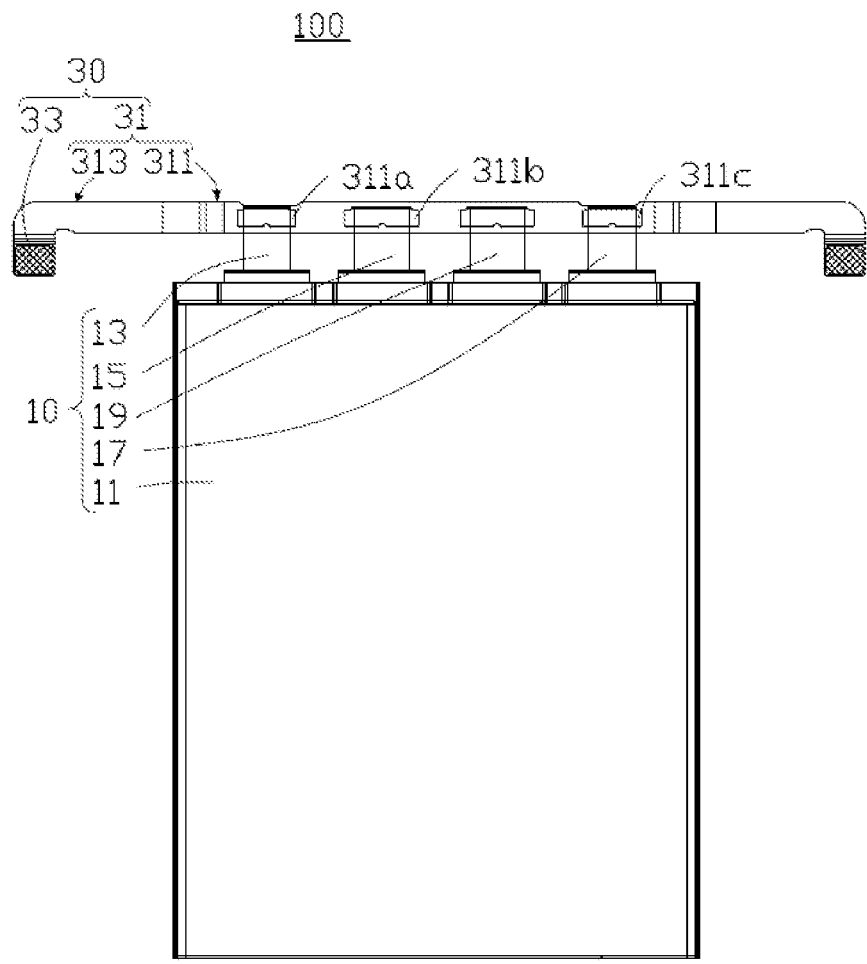
FIG. 4 is a schematic structural diagram of a battery according to an embodiment of this application.

In some embodiments, referring to FIG. 4, the battery cell 10 may further include a fourth connecting piece 19 that electrically connects the cell body 11 and the protection circuit board 30. The polarity of the fourth connecting piece 19 is same as that of the second connecting piece 15. The fourth connecting piece 19 and the second connecting piece 15 are electrically connected to the cell body 11 independently. The battery cell 10 performs outputting through the fourth connecting piece 19 and the second connecting piece 15 that have identical polarity, thereby further reducing concentration of heat of the battery cell 10 during the outputting and being conducive to dissipation of heat. In addition, the fourth connecting piece 19 and the second connecting piece 15 that have identical polarity are electrically connected to the protection circuit board 30, thereby further facilitating the wiring in the protection circuit board 30 and further reducing the temperature rise of the protection circuit board 30 during use of the battery 100.

As shown in FIG. 4, the fourth connecting piece 19 may be disposed between the first connecting piece 13 and the third connecting piece 17, and spaced apart from the first connecting piece 13, the second connecting piece 15, and the third connecting piece 17. The fourth connecting piece 19 may also be disposed at a side of the third connecting piece 17, the side being away from the second connecting piece 15. Preferably, the first connecting piece 13 and the adjacent second connecting piece 15 are electrically connected to a connector adjacent to the first connecting piece 13. The third connecting piece 17 and the adjacent fourth connecting piece 19 are electrically connected to a connector adjacent to the third connecting piece 17, thereby being more conducive to protecting the wiring in the circuit board 30.

Figure 5:
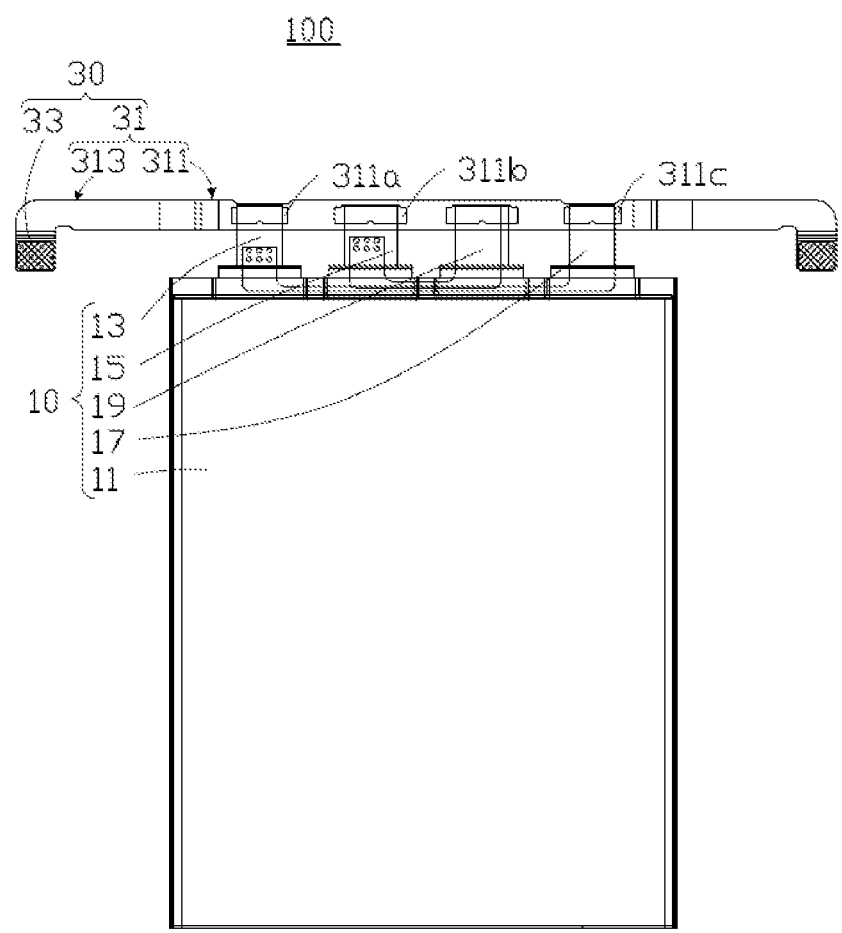
FIG. 5 is a schematic structural diagram of a battery according to an embodiment of this application.

In some embodiments, referring to FIG. 5, the fourth connecting piece 19 is electrically connected to the cell body 11 by the second connecting piece 15. Specifically, one end of the second connecting piece 15 is connected to the cell body 11, and the other end is connected to the protection circuit board 30. One end of the fourth connecting piece 19 is electrically connected to the second connecting piece 15, and the other end is electrically connected to the protection circuit board 30. In some embodiments, the fourth connecting piece 19 may be connected to the second connecting piece 15 by a nickel strap or a flexible circuit board.

In some embodiments, the polarity of the fourth connecting piece 19 may be same as that of the first connecting piece 13. That is, there may be a plurality of connecting pieces whose polarity is same as that of the first connecting piece 13. As can be seen, there may be a plurality of connecting pieces whose polarity is same as that of the second connecting piece 15.

Figure 6:
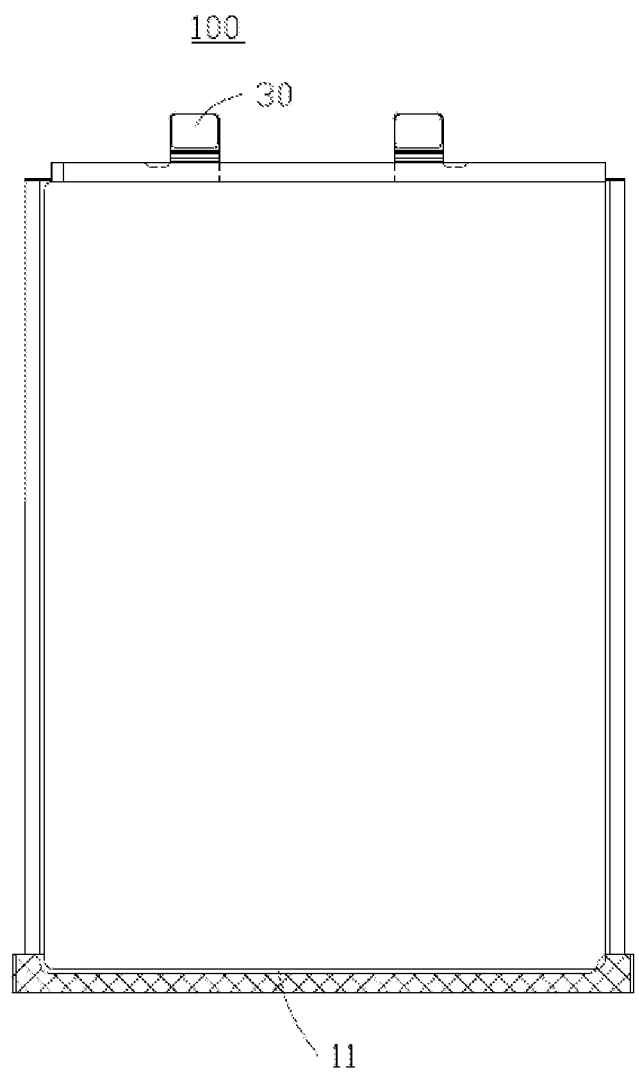
FIG. 6 is a schematic structural diagram of a battery according to an embodiment of this application.
Figure 7:
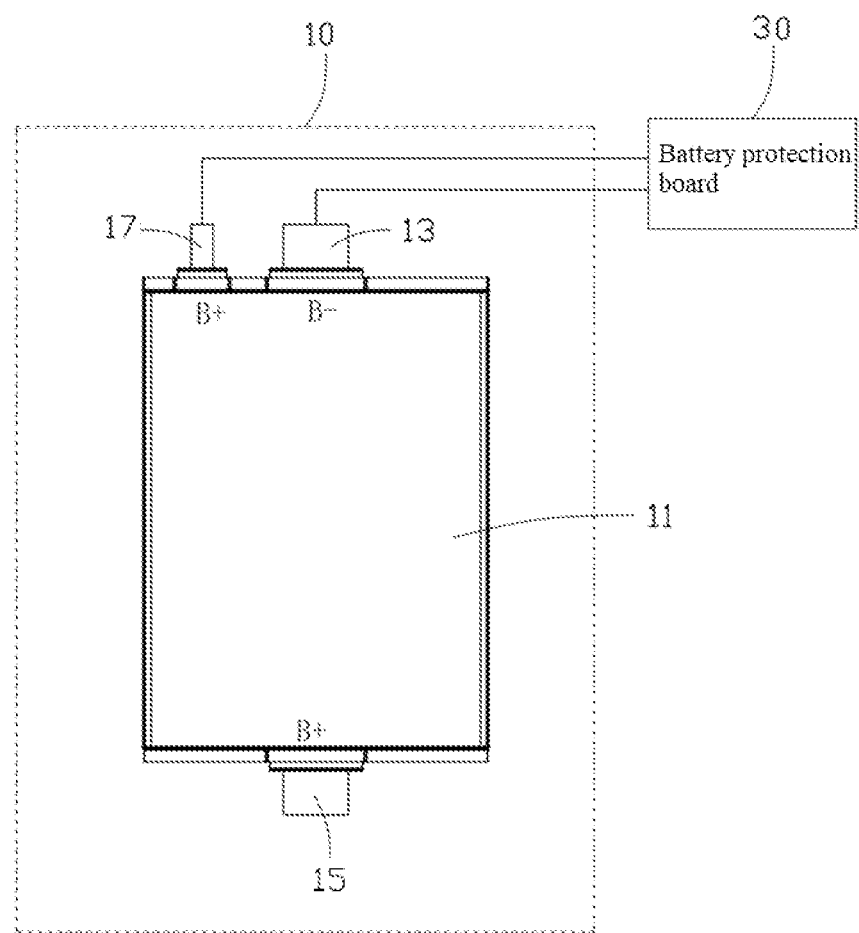
FIG. 7 is a schematic structural diagram of a battery cell structure according to an embodiment of this application.
Figure 8:
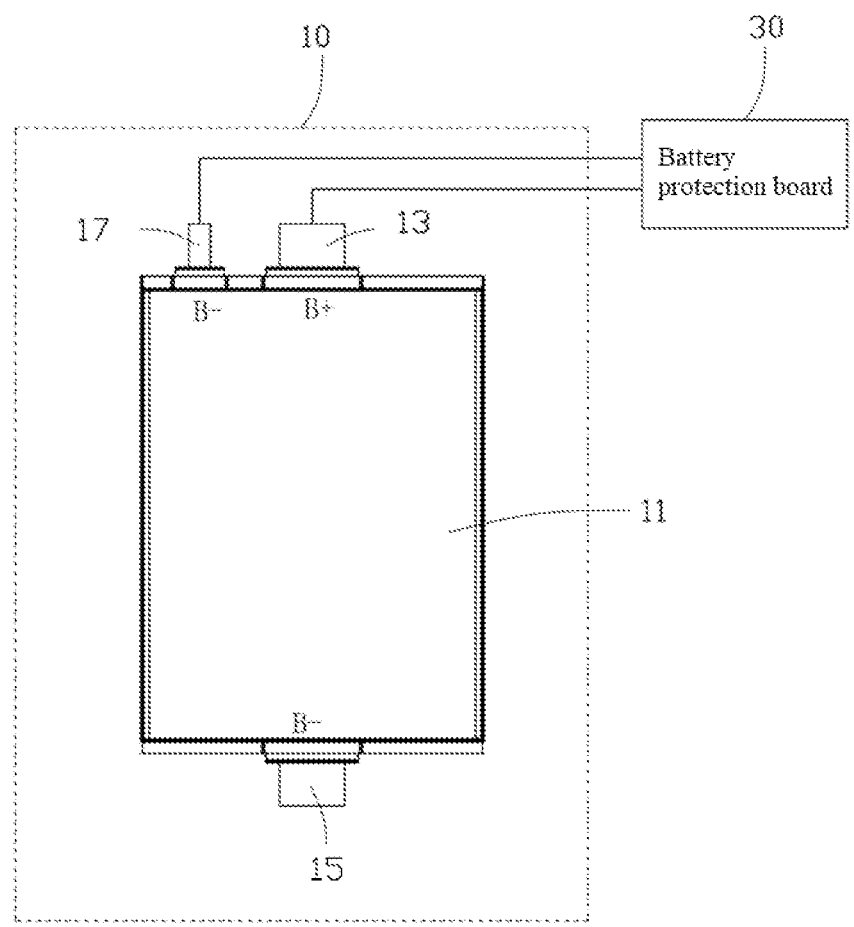
FIG. 8 is a schematic structural diagram of a battery cell structure according to another embodiment of this application.
Figure 9:
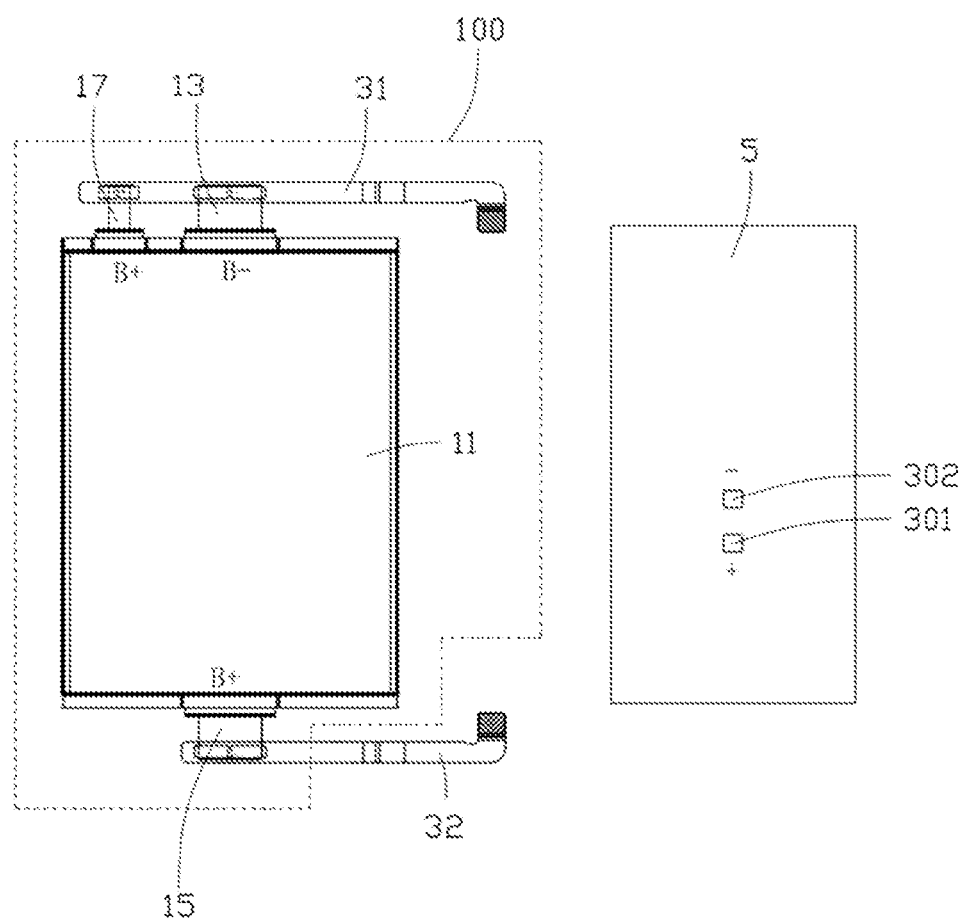
FIG. 9 is an application scenario diagram of a battery supplying power to an electronic device according to an embodiment of this application.
Figure 10:
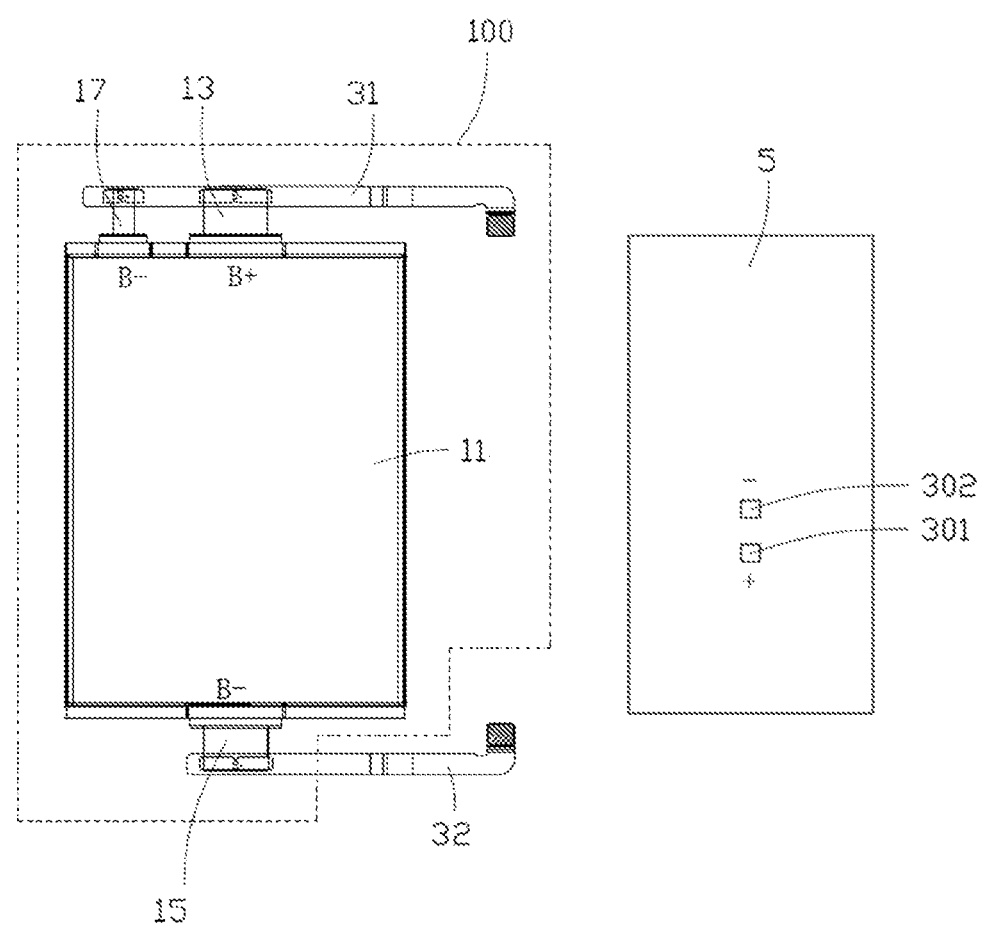
FIG. 10 is an application scenario diagram of a battery supplying power to an electronic device according to another embodiment of this application.
Figure 11:
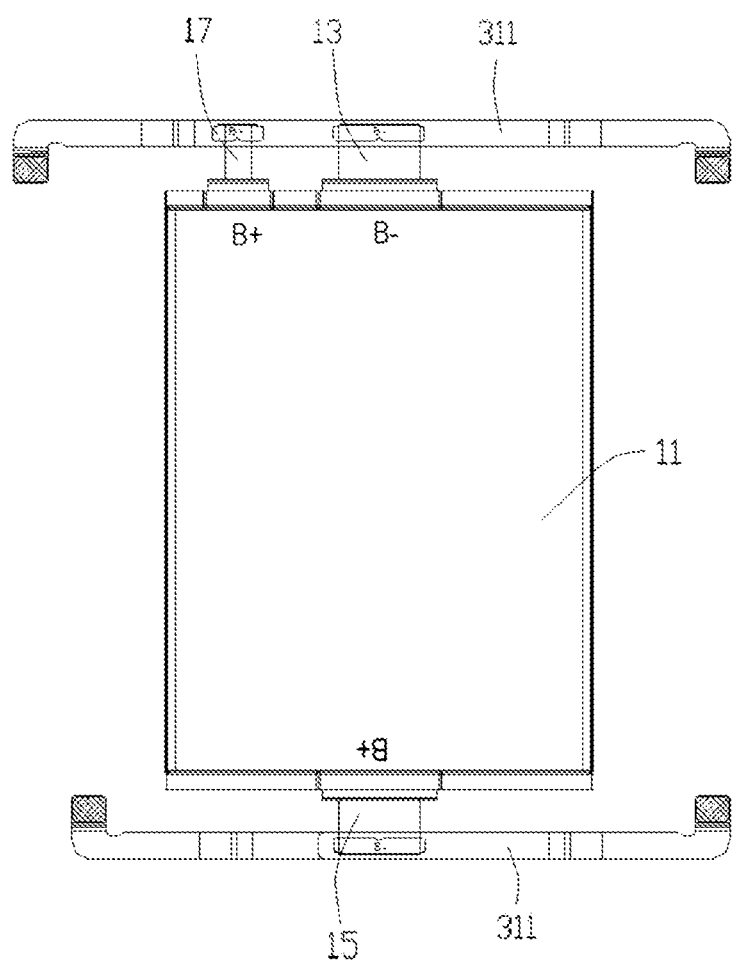
FIG. 11 is a schematic structural diagram of a battery according to an embodiment of this application, where the quantity of connectors of the battery is four.
Figure 12:
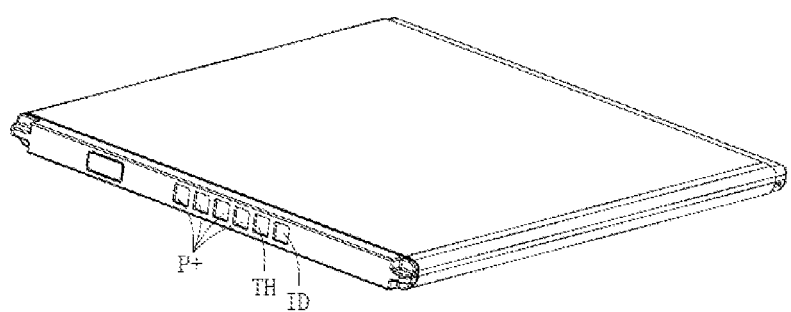
FIG. 12 is a schematic structural diagram of a battery cell structure packaged in a hard case and viewed from a first viewing angle according to an embodiment of this application.
Figure 13:
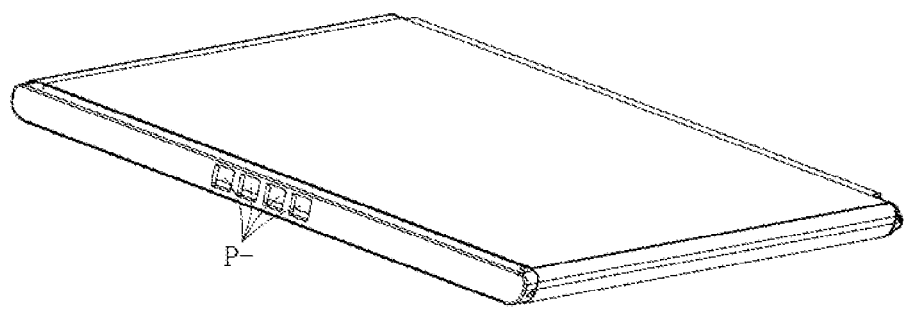
FIG. 13 is a schematic structural diagram of a battery cell structure packaged in a hard case and viewed from a second viewing angle according to an embodiment of this application.
Figure 14:
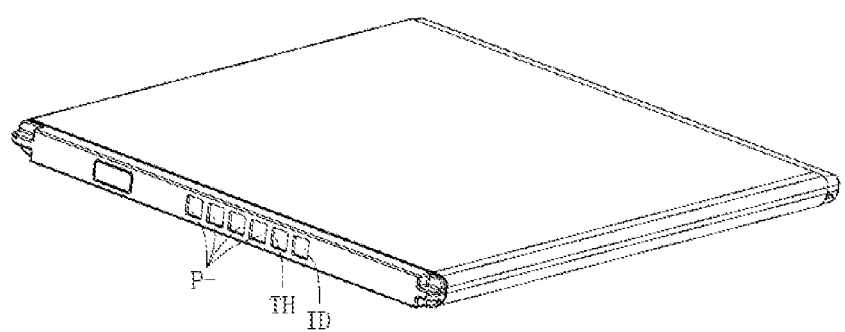
FIG. 14 is a schematic structural diagram of a battery cell structure packaged in a hard case and viewed from a first viewing angle according to another embodiment of this application.
Figure 15:
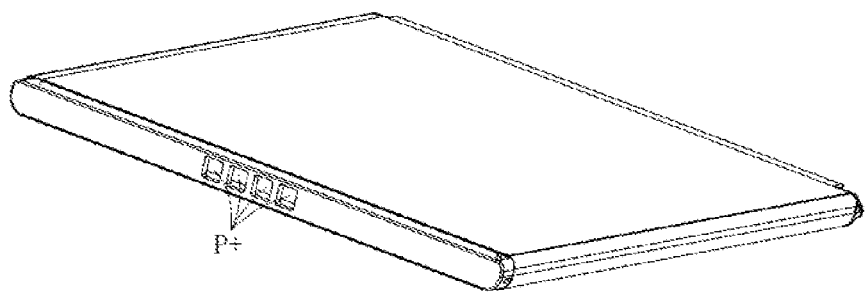
FIG. 15 is a schematic structural diagram of a battery cell structure packaged in a hard case and viewed from a second viewing angle according to another embodiment of this application.
Figure 16:
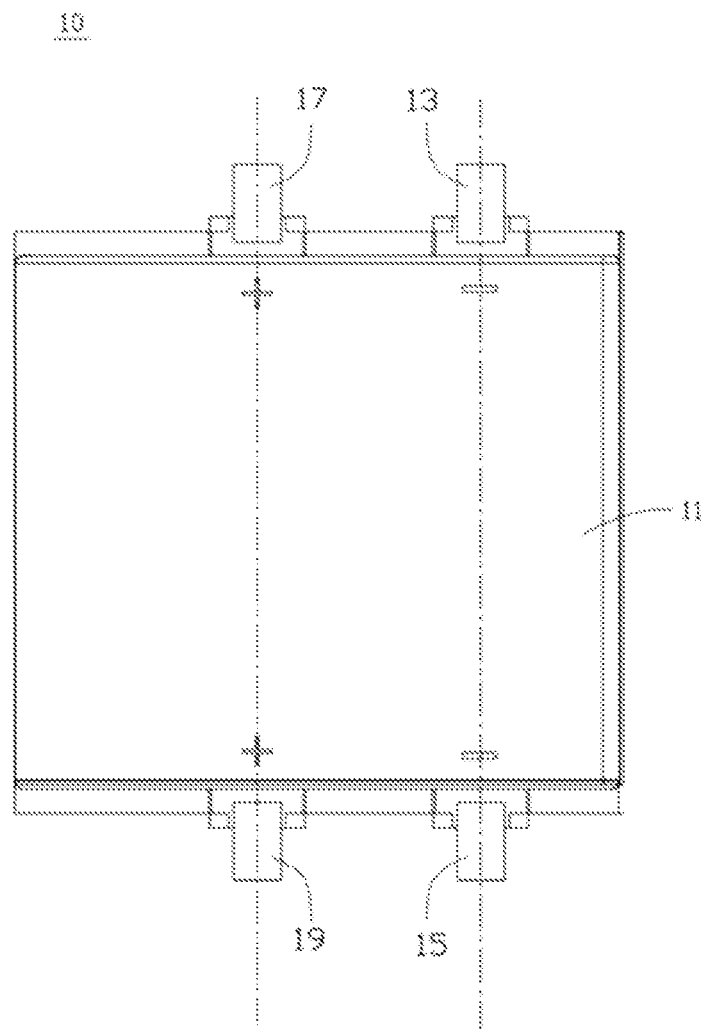
FIG. 16 is a schematic diagram of a battery cell according to another embodiment of this application.

In this embodiment, referring to FIG. 6, the rigid board region 311 is folded toward the cell body 11, and the flexible board region 313 is folded toward the rigid board region 311 to reduce an overall size of the battery 100.

In some embodiments, as shown in FIG. 7 to FIG. 10, the first connecting piece 13 and the second connecting piece 15 are located at different sides of the cell body 111, and the third connecting piece 17 and the second connecting piece 15 are located on a same side of the cell body 11. The protection circuit board 30 includes a first protection board 31 and a second protection board 32. The first protection board 31 is connected to the first connecting piece 13, and the second protection board 32 is connected to the second connecting piece 15 and the third connecting piece 17.

In some embodiments, the first connecting piece 13 and the second connecting piece 15 may be located at two adjacent sides of the cell body 111 respectively.

In some embodiments, the first connecting piece 13 and the second connecting piece 15 are located at two opposite sides of the cell body 11 respectively.

In this embodiment, the second connecting piece 15 and the third connecting piece 17 are disposed on a same side of the cell body 111 to power the protection circuit board 30. The protection circuit board 30 is an integrated circuit board that protects a rechargeable lithium battery 100. A circuit structure of the protection circuit board 30 is based on the prior art, and is not detailed herein. The battery cell 10 provided in this application performs outputting of connecting pieces at both sides of the cell body 111. The first connecting piece 13 and the second connecting piece 15 can meet requirements of passing a high current and make a charge and discharge circuit of the battery cell 10 smooth. In addition, the protection circuit board 30 is powered by using the second connecting piece 15 and the third connecting piece 17 to implement a protection function of the battery 100. Because the first connecting piece 13 and the second connecting piece 15 are disposed at different sides of the cell body 111 to decentralize heat sources and reduce the temperature rise caused by heat emission, and because the protection circuit board 30 does not need to be connected to the first connecting piece 13, design complexity and development cost of the protection circuit board 30 are reduced.

In some embodiments, because the first connecting piece 13 and the second connecting piece 15 are disposed at two sides of the cell body 111, tabs of the first connecting piece 13 and the second connecting piece 15 can be designed to be wider to allow for a high current and reduce heat emission. Widths of the tabs of the first connecting piece 13 and the second connecting piece 15 may be set according to actual requirements of passing a high current. The width of the tab of the first connecting piece 13 may be equal to or not equal to the width of the tab of the second connecting piece 15. For example, in a structure of a battery cell 10 of a battery 100 for use in an existing mobile device, the widths of positive and negative tabs disposed on a same side generally may be designed to be up to 8 mm. Because the first connecting piece 13 and the second connecting piece 15 according to this application are disposed at different sides of the cell body 111, the widths of the tabs of the first connecting piece 13 and the second connecting piece 15 may be designed to be 10 millimeters or even greater than 10 millimeters.

In some embodiments, because the third connecting piece 17 is configured to power the protection circuit board 30 and no high current needs to be passed, the width of the tab of the third connecting piece 17 may be designed to be smaller. The width of the third connecting piece 17 is preferably smaller than the width of the first connecting piece 13, and smaller than the width of the second connecting piece 15. For example, the widths of the tabs of the first connecting piece 13 and the second connecting piece 15 are 10 millimeters, and the width of the tab of the third connecting piece 17 is 5 millimeters.

In some embodiments, the first connecting piece 13 and the second connecting piece 15 are located at two opposite sides of the cell body 111 respectively, and the first connecting piece 13 and the second connecting piece 15 are centrosymmetric about a center of the cell body 111.

In some embodiments, the first connecting piece 13 and the second connecting piece 15 are located at two opposite sides of the cell body 111 respectively, and the first connecting piece 13 and the second connecting piece 15 are not centrosymmetric about the center of the cell body 111.

In some embodiments, a direction of extending the first connecting piece 13 from the cell body 111 is opposite to a direction of extending the second connecting piece 13 from the cell body 111.

In some embodiments, the direction of extending the first connecting piece 13 from the cell body 111 is opposite to a direction of extending the third connecting piece 13 from the cell body 111. The direction of extending the third connecting piece 17 from the cell body 111 is same as the direction of extending the second connecting piece 15 from the cell body 111.

In some embodiments, as shown in FIG. 16 to FIG. 26, the battery cell 10 further includes a fourth connecting piece 19.

The fourth connecting piece 19 electrically connects the cell body 11 and the protection circuit board 30, and the polarity of the fourth connecting piece 19 is same as that of the second connecting piece 15. The fourth connecting piece 19 and the first connecting piece 13 are located on a same side of the cell body 11. The first protection board 31 and the second protection board 32 include a charging protection function. The first protection board 31 is connected to the first connecting piece 13 and the fourth connecting piece 19, and the second protection board 32 is connected to the third connecting piece 17 and the second connecting piece 15. The first protection board 31 and the second protection board 32 each include an independent positive and negative electrodes. In this way, at least two charge circuits can be provided for the battery 100 to reduce a current flowing through the first protection board 31 and the second protection board 32 and achieve a purpose of reducing the temperature rise. In this embodiment, the first protection board 31 and/or the second protection board 32 further include a discharge protection function. The first protection board 31, the first connecting piece 13, and the fourth connecting piece 19 are disposed on a same side of the cell body 10. The second protection board 32, the second connecting piece 15, and the third connecting piece 17 are disposed on a same side of the cell body 10.

In some embodiments, the battery 100 further includes at least one first connector 33 and at least one second connector 34. At least one of the first connector 33 is connected to the first protection board 31, and at least one of the second connector 34 is connected to the second protection board 32. In this embodiment, the quantity of the first connector 33 is two, and the quantity of the second connectors 34 is two. Both of the two first connectors 33 are connected to the first connector 13 and the fourth connector 19 by the first protection board 31. Both of the two second connectors 34 are connected to the second connector 15 and the third connector 17 by the second protection board 32.

The two first connectors 33 may include a positive electrode and a negative electrode respectively, or may each include a positive electrode and a negative electrode. The two second connectors 34 may include a positive electrode and a negative electrode respectively, or may each include a positive electrode and a negative electrode. If the two first connectors 33 include a positive electrode and a negative electrode respectively, and the two second connectors 34 include a positive electrode and a negative electrode respectively, two charge circuits are available for the battery 100 during charging. Without reducing the total power, the current flowing through each protection board is half of the current flowing through a single protection board designed in a conventional single-protection-board scheme. If the two first connectors 33 each include a positive electrode and a negative electrode or the two second connectors 34 each include a positive electrode and a negative electrode, three charge circuits are available for the battery 100 during charging. Without reducing the total power, the current flowing through the first protection board 31 and the current flowing through the second protection board 32 are two-thirds and one-third, respectively, of the current flowing through a single protection board designed in a conventional single-protection-board scheme, or are one-third and two-thirds, respectively, of the current flowing through a single protection board designed in a conventional single-protection-board scheme. If the two first connectors 33 each include a positive electrode and a negative electrode and the two second connectors 34 each include a positive electrode and a negative electrode, fourth charge circuits are available for the battery 100 during charging. Without reducing the total power, the current flowing through each protection board is half of the current flowing through a single protection board designed in a conventional single-protection-board scheme.

According to the heat formula $Q=I^2Rt$, with a constant resistance value of each protection board circuit, the lower the current flowing through each protection board, the less the heat emitted per unit time. In addition, through parallel connection of a plurality of charge circuits, an overall resistance of the circuit board is reduced, and a capacity of passing a high current is enhanced. Through a plurality of connectors, a plurality of charge circuits are provided to shunt a charge current. This reduces the current flowing through each protection board, so as to implement charging at a higher current without a large temperature rise.

Obviously, this application can implement not only shunting of the charge current, but also shunting of the discharge current without causing a large temperature rise.

Figure 19:
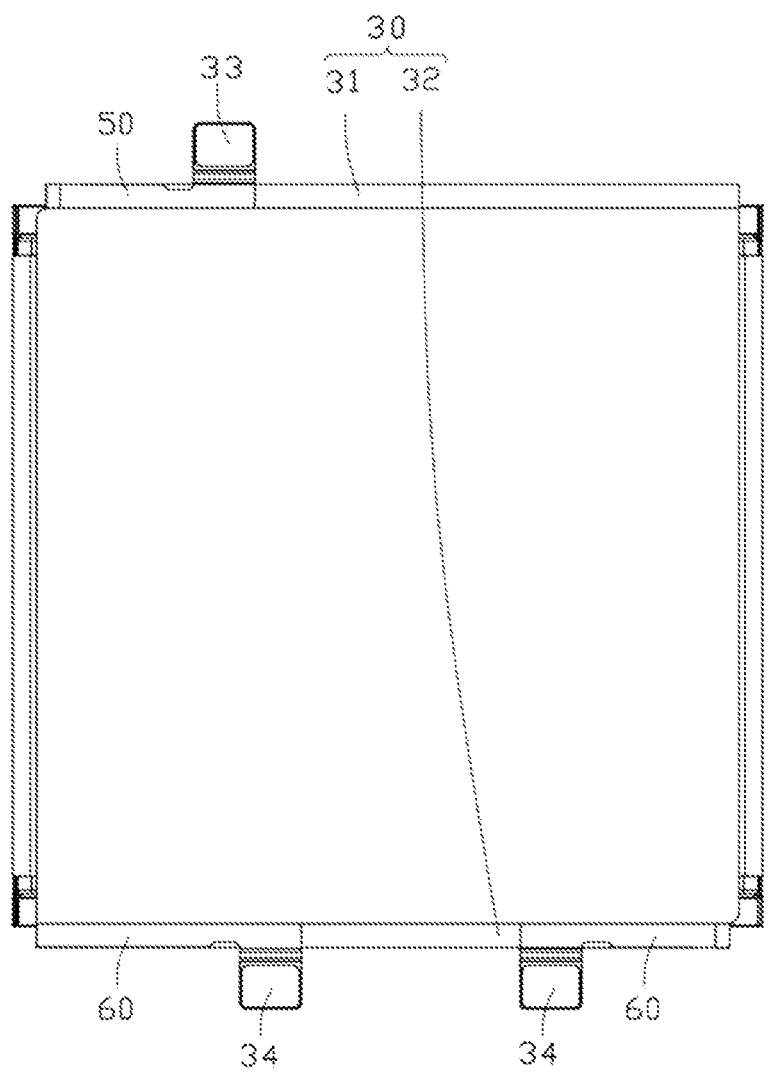
FIG. 19 is a schematic diagram of a battery containing the battery cell shown in FIG. 16 according to an embodiment of this application, where the quantity of connectors of the battery is three.
Figure 20:
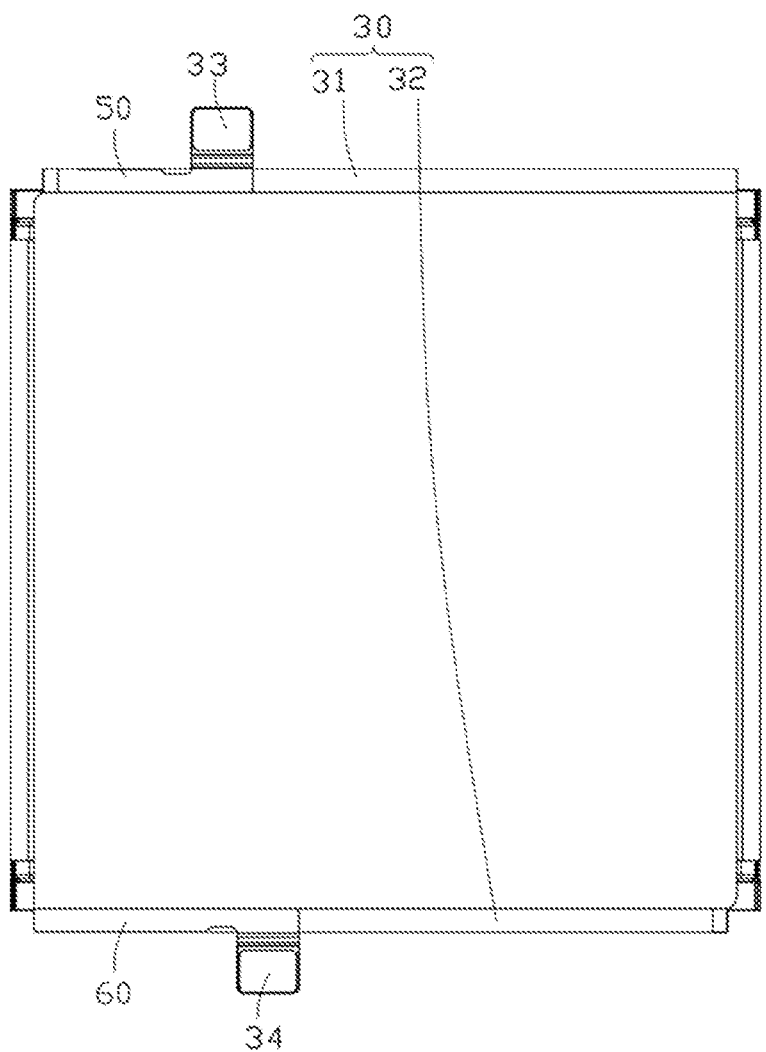
FIG. 20 is a schematic diagram of a battery containing the battery cell shown in FIG. 16 according to an embodiment of this application, where the quantity of connectors of the battery is two.
Figure 21:
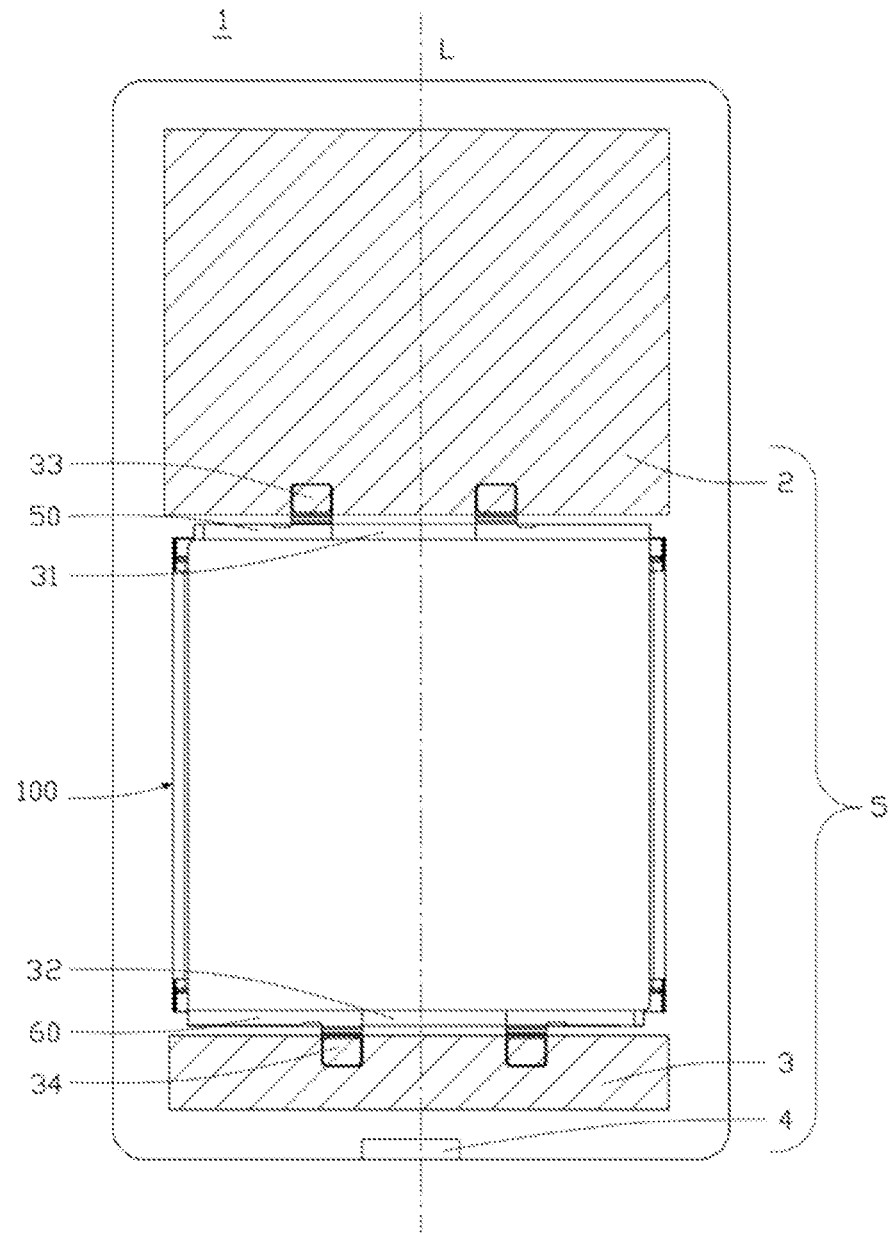
FIG. 21 is a schematic diagram of an electronic device containing the battery shown in FIG. 18.

Obviously, the quantity of connectors is not limited to four, and the sum of the quantity of the first connectors 33 and the quantity of the second connectors 34 may be two or three, as shown in FIG. 19 and FIG. 20. For example, the quantity of the first connector 33 is one, the quantity of the second connectors 34 is two (as shown in FIG. 19); or, the quantity of the first connectors 33 is two, and the quantity of the second connector 34 is one; or, the quantity of the first connector 33 is one, and the quantity of the second connector 34 is one (as shown in FIG. 20). The position of the connector in the battery 100 is not limited to that shown in FIG. 19 and FIG. 20, and other variations may be derived. For example, the position of the first connector 33 in FIG. 19 changes from the position to the left of the battery cell 10 to the position to the right of the battery cell 10. The position of the first connector 33 and/or the second connector 34 in FIG. 20 changes from the position to the left of the battery cell 10 to the position to the right of the battery cell 10. If the quantity of the first connector 33 is one, the first connector 33 includes a positive electrode and a negative electrode. If the quantity of the first connector 33 is two, the two first connectors 33 may include a positive electrode and a negative electrode respectively, or may each include a positive electrode and a negative electrode. If the quantity of the second connector 34 is one, the second connector 34 includes a positive electrode and a negative electrode. If the quantity of the second connector 34 is two, the two second connectors 34 may include a positive electrode and a negative electrode respectively, or may each include a positive electrode and a negative electrode.

The battery 100 further includes a first connector adapter 50 in one-to-one correspondence to the first connector 33, and a second connector adapter 60 in one-to-one correspondence to the second connector 34. The first connector adapter 50 is connected between the first protection board 31 and the first connector 33 to form an electrical connection between the first connector 33 and the first protection board 31. The second connector adapter 60 is connected between the second protection board 32 and the second connector 34 to form an electrical connection between the second connector 34 and the second protection board 32. The first connector adapter 50 and the second connector adapter 60 include one of or any combination of a flexible circuit board, an electronic wire, a conductive sheet, or a gold finger. In this embodiment, both the first connector adapter 50 and the second connector adapter 60 are flexible circuit boards.

Figure 17:
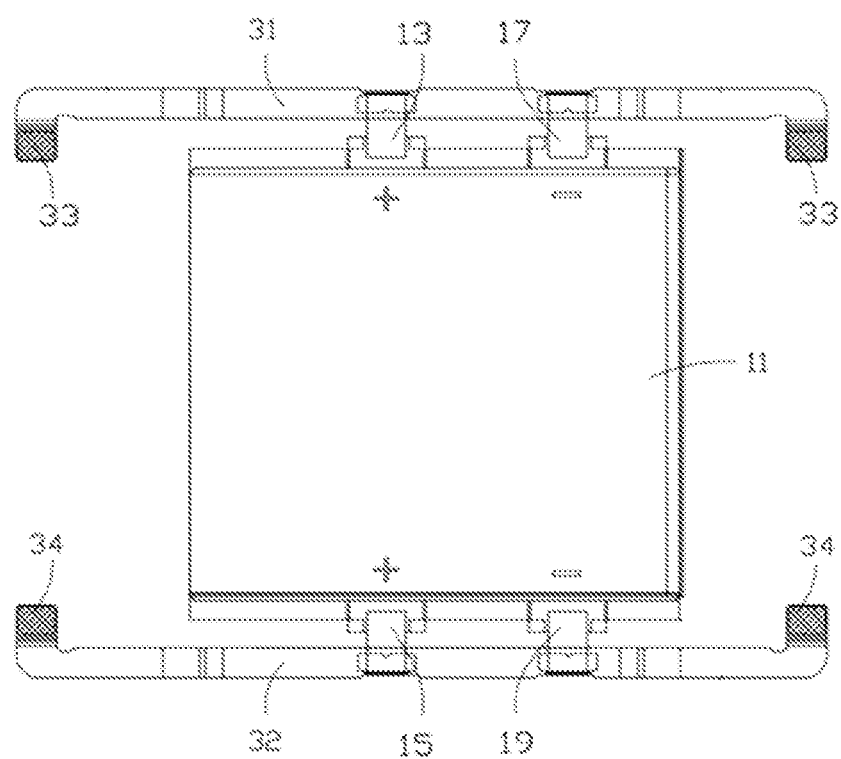
FIG. 17 is a schematic diagram of a semi-finished battery containing the battery cell shown in FIG. 16 according to an embodiment of this application.
Figure 18:
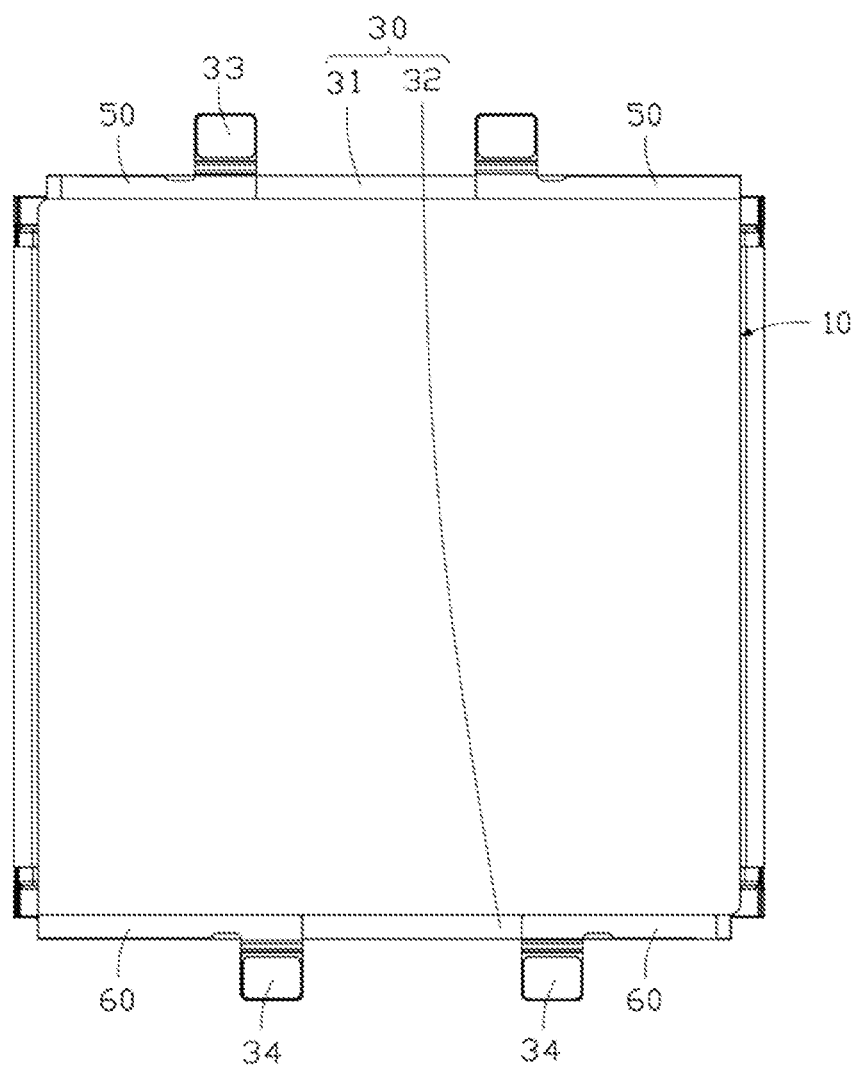
FIG. 18 is a schematic diagram of a battery containing the battery cell shown in FIG. 16 according to an embodiment of this application, where the quantity of connectors of the battery is four.

In assembling the battery 100 from the semi-finished product shown in FIG. 17 into the finished product shown in FIG. 18, the first protection board 31 in FIG. 17 is folded toward the first connecting piece 13 and the fourth connecting piece 19 until the first connecting piece 13 fits snugly with the fourth connecting piece 19. In this case, the first connector adapter 50 and the first connector 33 are also turned over by 180 degrees along with the first protection board 31. The first connector adapter 50 is folded toward the first protection board 31 until the first connector adapter 50 fits snugly with the first protection board 31. In this case, the first connector 33 is turned over to be located at a side of the first protection board 31, the side being away from the battery cell 10. The assembly process of the second protection board 32, the second connector adapter 60, and the second connector 34 is same as that of the first protection board 31, the first connector adapter 50, and the first connector 33. In this way, the semi-finished battery 100 shown in FIG. 17 can be assembled into the finished battery 100 shown in FIG. 18.

In FIG. 18, the first protection board 31 and at least one of the first connector 33 are disposed on a same side of the battery cell 10. The second protection board 32 and at least one of the second connector 34 are disposed on a same side of the battery cell 10.

In some embodiments, the battery 100 is applied to an electronic device 1 to power other electronic components of the electronic device 1. The electronic device 1 may be, but is not limited to, a mobile phone, a computer, an electric toy, an electric car, or the like. The electronic device 1 not only includes the battery 100, and the electronic device 1 but also includes a main body 5. A connecting line between the first connecting piece 13 and the fourth connecting piece 19 as well as a connecting line between the second connecting piece 15 and the third connecting piece 17 are parallel to an axis of the main body 5. The axis of the main body 5 is shown by a dashed line L in FIG. 21. A connecting line between the first connecting piece 13 and the third connecting piece 17 is parallel to the axis of the main body 5, and a connecting line between the fourth connecting piece 19 and the second connecting piece 15 is parallel to the axis of the main body 5. The first protection board 31 and the second protection board 32 are perpendicular to the axis of the main body 5.

Figure 22:
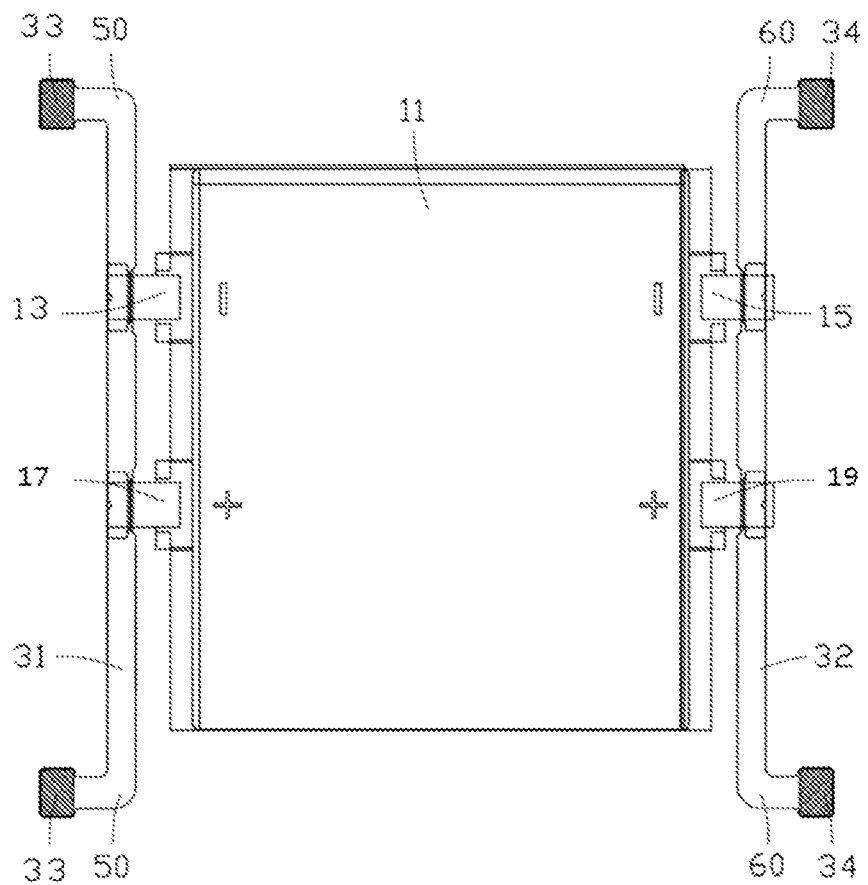
FIG. 22 is a schematic diagram of a semi-finished battery containing the battery cell shown in FIG. 16 according to an embodiment of this application.
Figure 23:
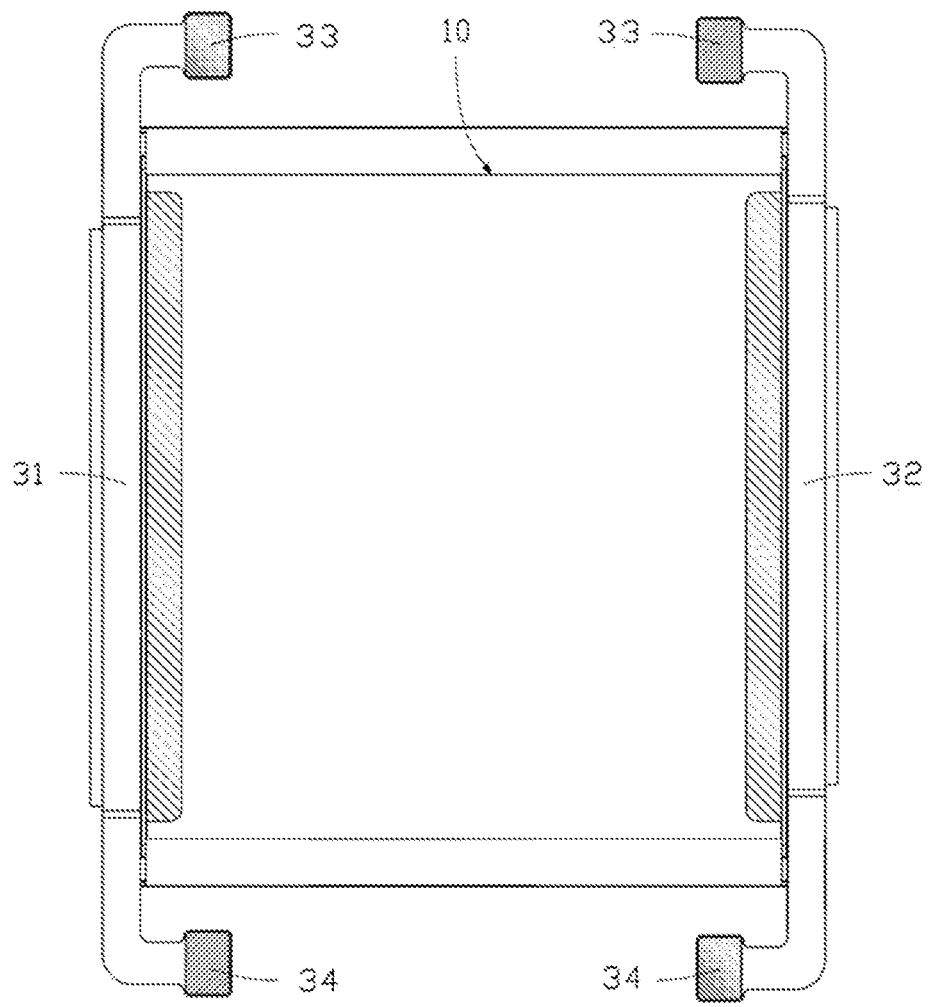
FIG. 23 is a schematic diagram of a battery containing the battery cell shown in FIG. 16 according to an embodiment of this application, where the quantity of connectors of the battery is four.
Figure 24:
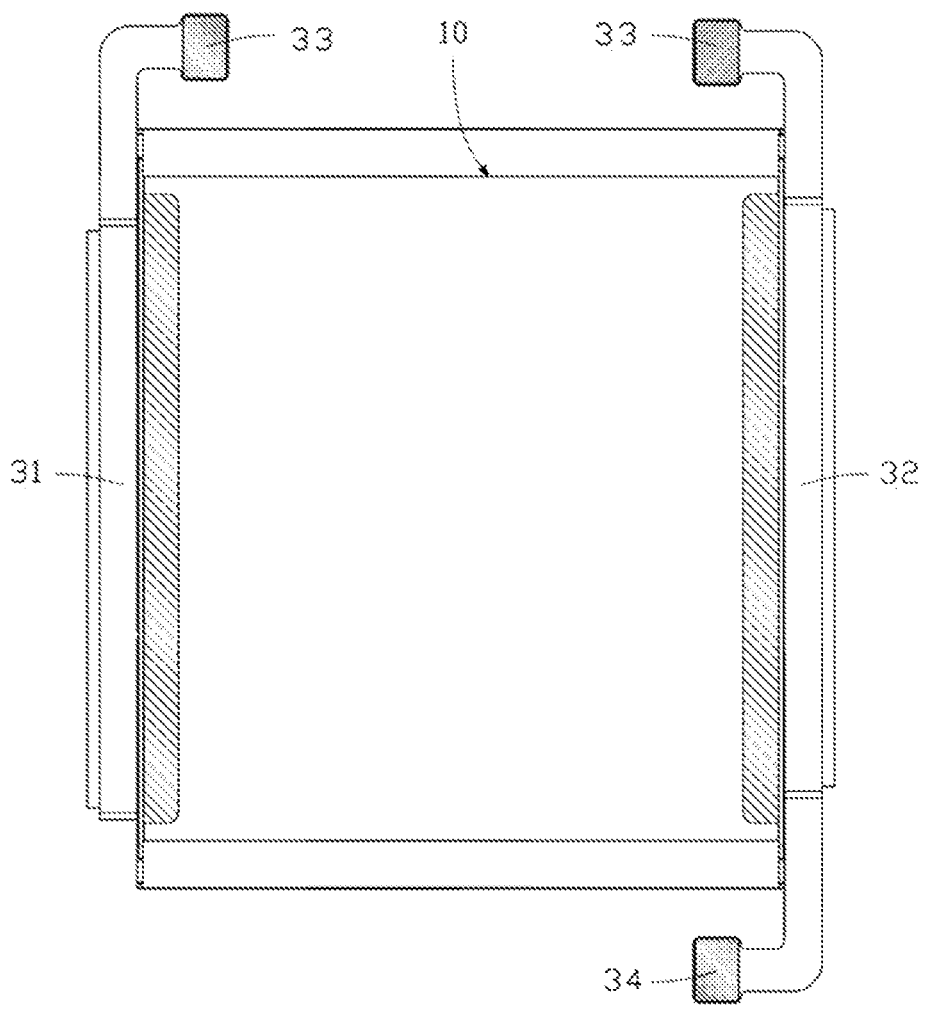
FIG. 24 is a schematic diagram of a battery containing the battery cell shown in FIG. 16 according to an embodiment of this application, where the quantity of connectors of the battery is three.
Figure 25:
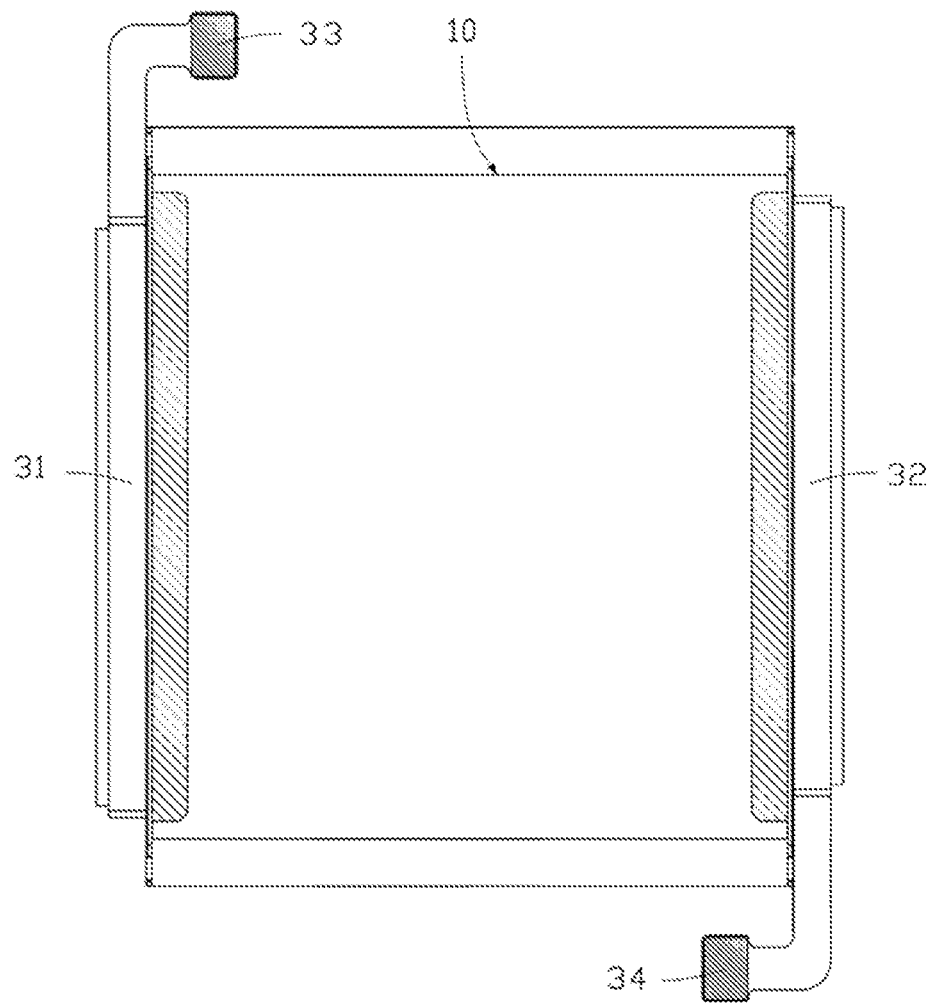
FIG. 25 is a schematic diagram of a battery containing the battery cell shown in FIG. 16 according to an embodiment of this application, where the quantity of connectors of the battery is two.

FIG. 22 is a schematic diagram of a semi-finished battery 100 containing the battery cell 10 according to a second embodiment of this application. FIG. 23 to FIG. 25 are schematic diagrams of a battery 100 containing the battery cell 10 shown in FIG. 16 according to a second embodiment of this application. The structure of the battery 100 shown in FIG. 22, FIG. 23, FIG. 24, and FIG. 25 is similar to the structure of the battery 100 shown in FIG. 17, FIG. 18, FIG. 19, and FIG. 20 respectively, but differs in that: in assembling the battery 100 from the semi-finished product shown in FIG. 22 into the finished product shown in FIG. 23, the first protection board 31 in FIG. 22 is folded toward the first connecting piece 13 and the fourth connecting piece 19 until the first connecting piece 13 fits snugly with the fourth connecting piece 19. In this case, the first connector adapter 50 and the first connector 33 are also turned over by 180 degrees along with the first protection board 31, so that the first connector 33 and the first protection board 31 are disposed at different sides of the battery cell 10. The assembly process of the second protection board 32, the second connector adapter 60, and the second connector 34 is same as that of the first protection board 31, the first connector adapter 50, and the first connector 33. In this way, the semi-finished battery 100 shown in FIG. 22 can be assembled into the finished battery 100 shown in FIG. 23. In FIG. 23, the first protection board 31 and at least one of the first connector 33 are disposed at different sides of the battery cell 10, and the second protection board 32 and at least one of the second connector 34 are disposed at different sides of the battery cell 10.

Figure 26:
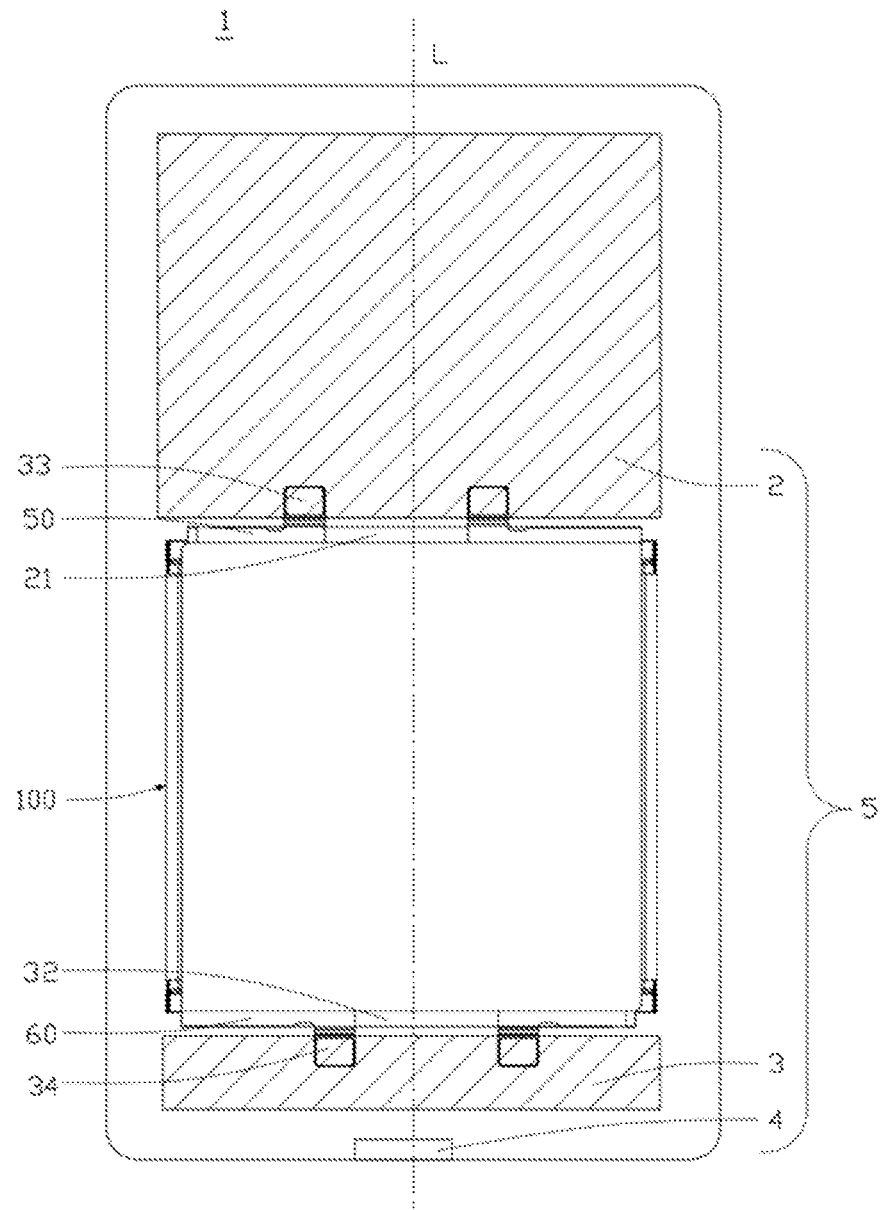
FIG. 26 is a schematic diagram of an electronic device containing the battery shown in FIG. 23.

FIG. 26 is a schematic diagram of an electronic device 1 containing the battery 100 according to the second embodiment. The structure of the electronic device 1 shown in FIG. 26 is similar to the structure of the electronic device 1 shown in FIG. 21, but differs in that: referring to FIG. 21, the connecting line between the first connecting piece 13 and the fourth connecting piece 19 as well as the connecting line between the second connecting piece 15 and the third connecting piece 17 are perpendicular to the axis of the main body 5. The axis of the main body 5 is shown by a dashed line L in FIG. 26. The connecting line between the first connecting piece 13 and the third connecting piece 17 is perpendicular to the axis of the main body 5, and the connecting line between the fourth connecting piece 19 and the second connecting piece 15 is perpendicular to the axis of the main body 5. The first protection board 31 and the second protection board 32 are parallel to the axis of the main body 5.

In this application, a first electrical connection component and a second electrical connection component are disposed at two opposite ends of the main body of the battery cell 10 respectively, and the first protection board 31 and the second protection board 32 are connected to the first electrical connection component and the second electrical connection component respectively, so as to provide a plurality of charge circuits for the battery 100. Without reducing the total power, the current flowing through each protection board is reduced, so that a large temperature rise of the protection board is avoided. By disposing two first connectors 33 and two second connectors 34, the battery 100 may be charged through the two first connectors 33 and two second connectors 34, so that charging at a higher current is achieved. With respect to a positional relationship between the battery 100 and the main body 5, the connecting line between the first connecting piece 13 and the fourth connecting piece 19 as well as the connecting line between the second connecting piece 15 and the third connecting piece 17 are parallel to the axis of the main body 5; and the first protection board 31 and the second protection board 32 are perpendicular to the axis of the main body 5. Alternatively, the connecting line between the first connecting piece 13 and the fourth connecting piece 19 as well as the connecting line between the second connecting piece 15 and the third connecting piece 17 are perpendicular to the axis of the main body 5; and the first protection board 31 and the second protection board 32 are parallel to the axis of the main body 5, so that the mounting position of the battery 100 is flexible.

In some implementations, the electronic device 1 further includes a first circuit board 2, a second circuit board 3, and a charge interface 4. The first circuit board 2, the second circuit board 3, and the charge interface 4 are all disposed in the main body 5. The first circuit board 2 is parallel-connected to the second circuit board 3. Both the first circuit board 2 and the second circuit board 3 are connected to the charge interface 4. Both the first circuit board 2 and the second circuit board 3 are connected to the battery 100. In this embodiment, a connecting piece connected to the first connector 33 and the second connector 34 is disposed on the first circuit board 2 and the second circuit board 3 separately. The first circuit board 2 is connected to the battery 100 by the first protection board 31, and the second circuit board 3 is connected to the battery 100 by the second protection board 32. Specifically, the first circuit board 2 is connected to the battery 100 by the first connector 33, the first connector adapter 50, and the first protection board 31. The second circuit board 3 is connected to the battery 100 by the second connector 34, the second connector adapter 60, and the second protection board 32.

In this way, in charging the battery 100, the charge current enters the electronic device 1 through the charge interface 4, and is divided into a first current and a second current, and enters the battery 100 through the first circuit board and the second circuit board respectively. The first charge current enters the battery 100 through the first circuit board 2, the first connector 33, the first connector adapter 50, and the first protection board 31. The second charge current enters the battery 100 through the second circuit board 3, the second connector 34, the second connector adapter 60, and the second protection board 32, so as to implement charging at a higher current.

Various modifications and variations may be made by a person of ordinary skill in the art based on the technical conception hereof, and all such modifications and variations fall within the protection scope of this application.

What is claimed is:

1. A battery, comprising a battery cell and a protection circuit board, wherein the battery cell comprises:
    a cell body;
    a first connecting piece configured to electrically connect the cell body and the protection circuit board;
    a second connecting piece configured to electrically connect the cell body and the protection circuit board, wherein a polarity of the second connecting piece is opposite to that of the first connecting piece; and
    a third connecting piece configured to electrically connect the cell body and the protection circuit board, wherein a polarity of the third connecting piece is same as that of the first connecting piece,
    wherein
        the first connecting piece and the third connecting piece are located on a same side of the cell body; and
        the first connecting piece and the third connecting piece are electrically connected to the cell body independently, or the third connecting piece is electrically connected to the cell body by the first connecting piece.

2. The battery according to claim 1, wherein the battery cell further comprises a fourth connecting piece, the fourth connecting piece electrically connects the cell body and the protection circuit board, and a polarity of the fourth connecting piece is same as that of the second connecting piece.

3. The battery according to claim 2, wherein the protection circuit board comprises a circuit board body and at least one connector, and each connector is disposed on the circuit board body.

4. The battery according to claim 3, wherein the circuit board body is a rigid-flex board and comprises a rigid board region and a flexible board region connected to the rigid board region; the first connecting piece, the second connecting piece, and the third connecting piece are connected to the rigid board region; and the at least one connector is disposed in the flexible board region.

5. The battery according to claim 1, wherein the first connecting piece and the second connecting piece are located at two opposite sides of the cell body respectively; and
    the protection circuit board comprises a first protection board and a second protection board, the first protection board is connected to the first connecting piece; and the second protection board is connected to the second connecting piece and the third connecting piece.

6. The battery according to claim 5, wherein the battery cell further comprises a fourth connecting piece, the fourth connecting piece electrically connects the cell body and the protection circuit board, and a polarity of the fourth connecting piece is same as that of the second connecting piece; and the fourth connecting piece and the first connecting piece are located on a same side of the cell body, and the first protection board is connected to the first connecting piece and the fourth connecting piece.

7. The battery according to claim 6, wherein
the battery further comprises two first connectors and two second connectors, both of the two first connectors are connected to the first connecting piece and the fourth connecting piece by the first protection board, and both of the two second connectors are connected to the second connecting piece and the third connecting piece by the second protection board.

8. The battery according to claim 5, wherein a width of the third connecting piece is less than a width of the first connecting piece and less than a width of the second connecting piece.

9. The battery according to claim 5, wherein the battery further comprises at least one first connector and at least one second connector, at least one of the first connector is connected to the first protection board, and at least one of the second connector is connected to the second protection board.

10. An electronic device, comprising: a battery, the battery comprises a battery cell and a protection circuit board,
a cell body;
a first connecting piece, configured to electrically connect the cell body and the protection circuit board;
a second connecting piece, configured to electrically connect the cell body and the protection circuit board, wherein a polarity of the second connecting piece is opposite to that of the first connecting piece; and
a third connecting piece, configured to electrically connect the cell body and the protection circuit board, wherein a polarity of the third connecting piece is same as that of the first connecting piece;
wherein
the first connecting piece and the third connecting piece are located on a same side of the cell body; and
the first connecting piece and the third connecting piece are electrically connected to the cell body independently, or the third connecting piece is electrically connected to the cell body by the first connecting piece.

11. The electronic device according to claim 10, wherein the first connecting piece and the second connecting piece are located at two opposite sides of the cell body respectively; and the protection circuit board comprises a first protection board and a second protection board, the first protection board is connected to the first connecting piece, and the second protection board is connected to the second connecting piece and the third connecting piece.

12. The electronic device according to claim 11, wherein the battery further comprises at least one first connector and at least one second connector, at least one of the first connector is connected to the first protection board, and at least one of the second connector is connected to the second protection board.

13. The electronic device according to claim 12, wherein the battery cell further comprises a fourth connecting piece, and a polarity of the fourth connecting piece is same as that of the second connecting piece; and the fourth connecting piece and the first connecting piece are located on a same side of the cell body, and the first protection board is connected to the first connecting piece and the fourth connecting piece.

14. The electronic device according to claim 13, wherein the battery further comprises two first connectors and two second connectors, both of the two first connectors are connected to the first connecting piece and the fourth connecting piece by the first protection board, and both of the two second connectors are connected to the second connecting piece and the third connecting piece by the second protection board.

15. The electronic device according to claim 14, wherein the electronic device further comprises a main body, and the first protection board and the second protection board are parallel to an axis of the main body.

16. The electronic device according to claim 14, wherein the electronic device further comprises a main body, and the first protection board and the second protection board are perpendicular to an axis of the main body.

* * * * *